July 15, 1952 H. O. STOTTS 2,603,525
PIPE CLAMP
Filed April 12, 1951
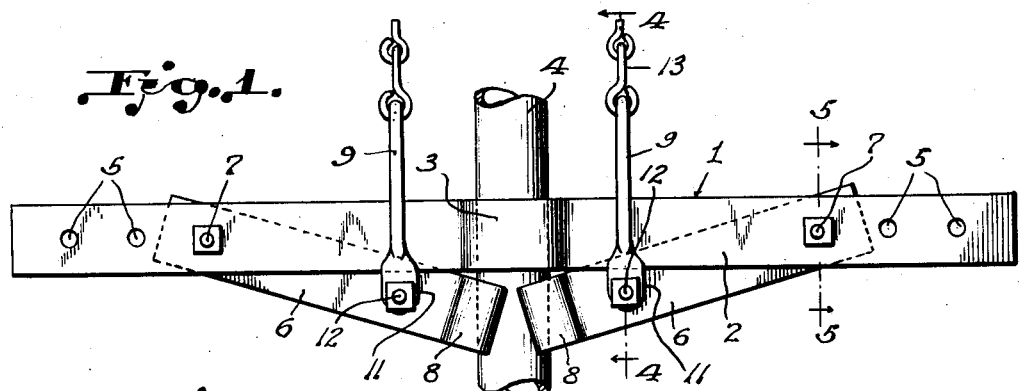
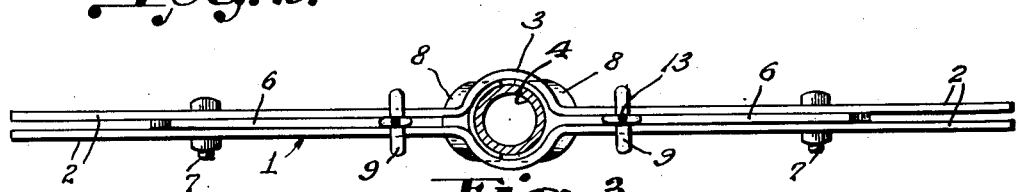
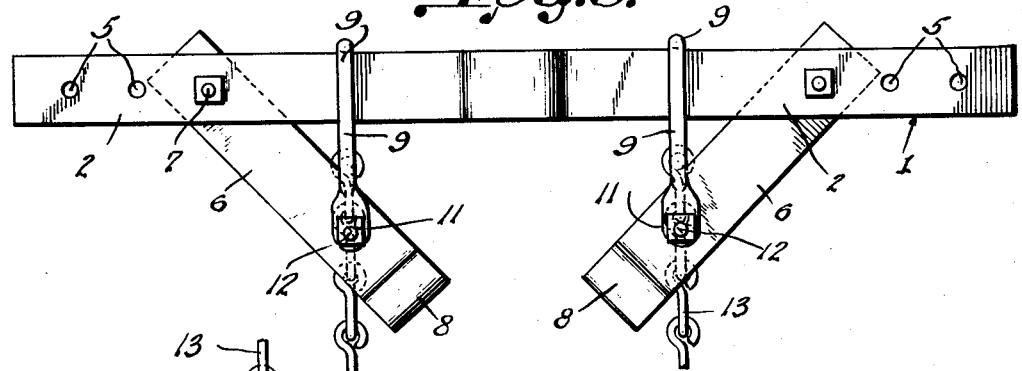
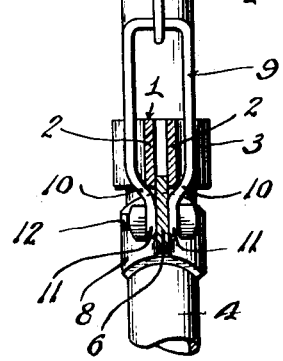
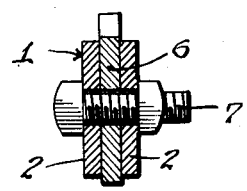
INVENTOR,
Howard O. Stotts.
BY
E. E. Vrooman & Co.
ATTORNEYS.

Patented July 15, 1952

2,603,525

UNITED STATES PATENT OFFICE 2,603,525

PIPE CLAMP

Howard O. Stotts, Corning, Calif.

Application April 12, 1951, Serial No. 220,555

2 Claims. (Cl. 294—113)

This invention relates to a pipe clamp.

An object of the invention is the production of an efficient clamp for operating on preferably oil well pipes.

Another object of the invention is to provide in a clamp pivoted jaws which are limited by yoke links from dropping down too far when the clamp is not in use, whereby the jaws are readily clamped against a pipe to be operated upon when the operator desires.

A still further object is the provision of a clamp that is strong and durable, and which includes means for adjusting the jaws longitudinally of the body of the clamp, whereby pipes of different diameters can be operated upon.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a clamp constructed in accordance with this invention, showing the clamp in a closed position.

Figure 2 is a top plan view of the clamp.

Figure 3 is a view in side elevation, showing the clamp in a released position.

Figure 4 is a sectional view, taken on line 4—4, Fig. 1, and looking in the direction of the arrows.

Figure 5 is a sectional view, looking in the direction of the arrows, Fig. 1.

Referring to the drawings in which the preferred embodiment of this invention is illustrated, 1 comprises the body, which includes two parallel bars 2, these bars being substantially straight and of the same length. At the center of each bar 2 is a semicircular pipe-holding portion 3, whereby a pipe 4 can be placed within the body when desired. The bars 2 have a plurality of pairs of aligned apertures 5.

The two jaws 6 are each mounted upon a bolt 7, which bolt is positioned in one of the pairs of apertures 5. Each jaw 6 has a semicircular grip 8 upon its outer end.

A yoke link 9 is provided for each jaw 6. This yoke link 9 straddles the two bars 2. The yoke link 9 is bent-in in two places as at 10 and these bent in portions terminate in eyes 11. A bolt 12 extends through the jaw 6 and through the eyes 11, thereby pivotally connecting the yoke link 9 to the jaw. It will therefore be seen that each yoke link 9 performs a dual function, to wit: it prevents the jaw 6 from falling too far down and it also provides a connecting means for the single chain 13, which chain has its ends connected to the top of the yoke links 9, as clearly shown.

The bolts 7 also perform dual functions, to wit: they connect the two pairs of bars 7, as well as provide the support for the pivotally mounted jaws 6.

It is to be noted that by adjusting bolts 7 along the body 1, by placing the bolts in different sets of apertures 5, that different sized pipes 4 can be operated upon.

In operation, the means for lifting the clamp is attached to the chain 13, and as the lifting action increases, the jaws 6 will close upon the pipe to be lifted, producing a very efficient and strong clamping action.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a pipe clamp, the combination, of a body comprising straight parallel bars, said bars provided at the center with pipe-receiving means, said bars provided near their ends with a plurality of sets of apertures, jaws positioned between said bars, each jaw having a bolt extending therethrough and also extending through one set of apertures of said bars, yoke links straddling said body and having portions at the sides of said jaws, each link being bent inwardly near its lower end and terminating in eyes, a bolt extending through said eyes and through a jaw, and a single chain having its ends connected to said yoke links.

2. In a pipe clamp, a body consisting of a pair of spaced bars, said bars having centrally disposed arcuate portions having confronting concave faces, said bars having ends extending in opposite directions from their centers, the ends of one bar being parallel to the ends of the other bar, the said bars having spaced bolt receiving openings adjacent their ends, the openings in one bar being opposite the openings in the other bar, a pair of jaws having confronting arcuate heads and having body portions engaging between the bolt opening provided portions of said bars, and bolts extending selectively through the bolt openings and through the body portions of the jaws, stop means limiting the opening of said jaws and comprising links straddling the end portions of said bars and pivoted to said jaws adjacent their heads, a chain connected to said links.

HOWARD O. STOTTS.

REFERENCES CITED

The following references are of record in the file of this patent:

UNITED STATES PATENTS

| Number | Name | Date |
|---|---|---|
| 673,679 | Foster et al. | May 7, 1901 |
| 910,062 | Holmberg | Jan. 19, 1909 |
| 1,396,317 | Boyter | Nov. 8, 1921 |
| 2,067,372 | Andrews | Jan. 12, 1937 |
| 2,160,892 | Neff | June 6, 1939 |